W. PARKES.
MOTION PICTURE CAMERA.
APPLICATION FILED JULY 21, 1917.

1,352,143.

Patented Sept. 7, 1920.
4 SHEETS—SHEET 1.

INVENTOR,
Walter Parkes,
BY Bates Macklin
ATTYS.

W. PARKES.
MOTION PICTURE CAMERA.
APPLICATION FILED JULY 21, 1917.

1,352,143.

Patented Sept. 7, 1920.
4 SHEETS—SHEET 2.

INVENTOR
Walter Parkes,
BY Baker & Macklin,
ATTYS.

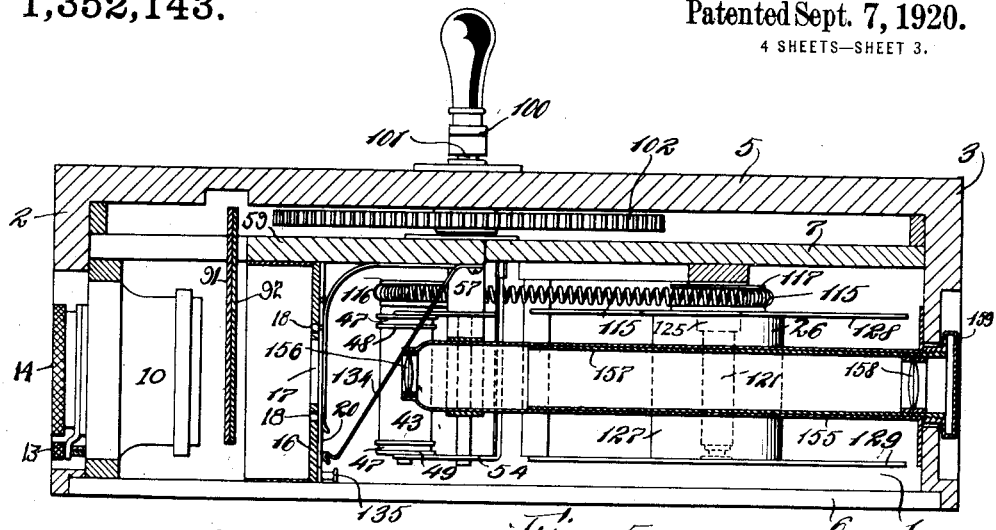
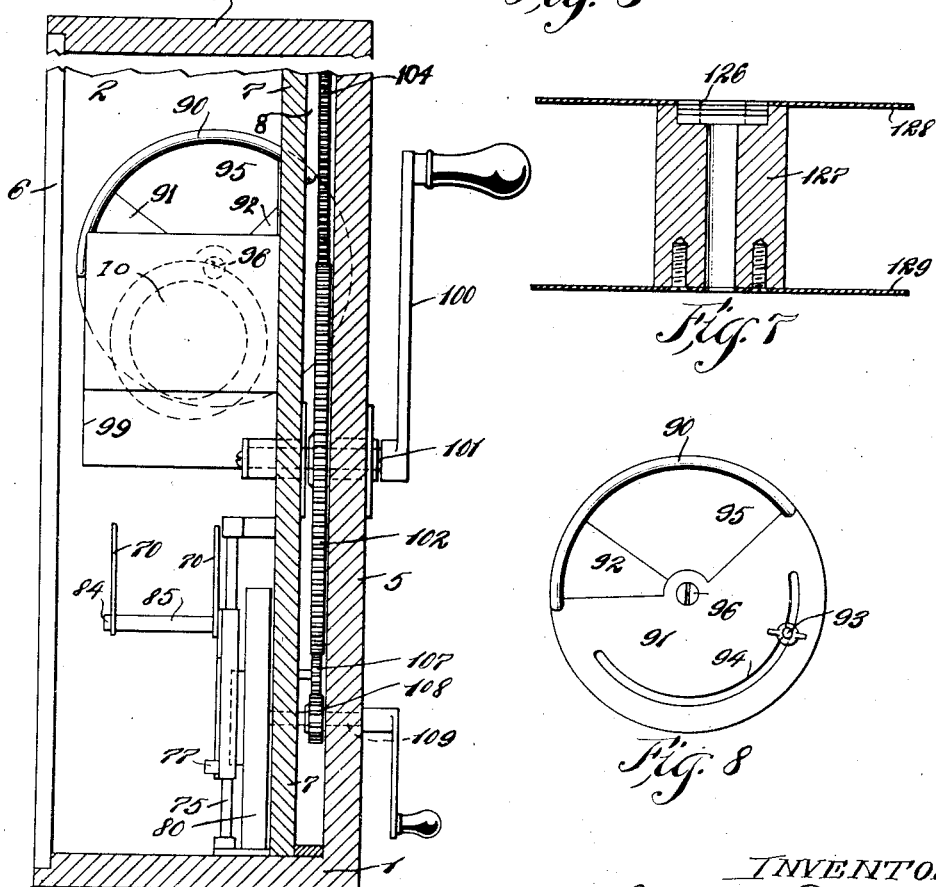

W. PARKES.
MOTION PICTURE CAMERA.
APPLICATION FILED JULY 21, 1917.
1,352,143.
Patented Sept. 7, 1920.
4 SHEETS—SHEET 4.
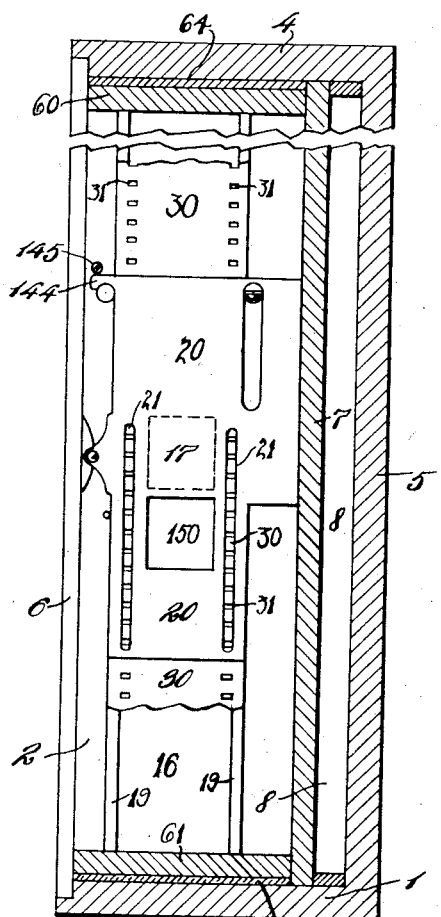
Fig. 9
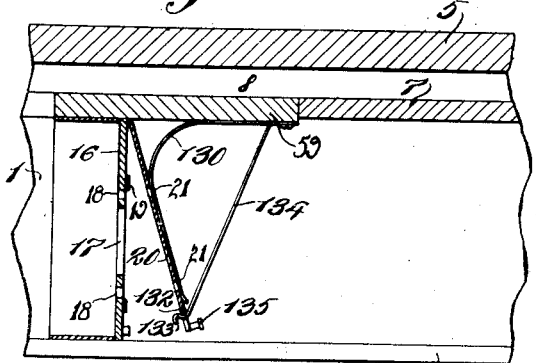
Fig. 10
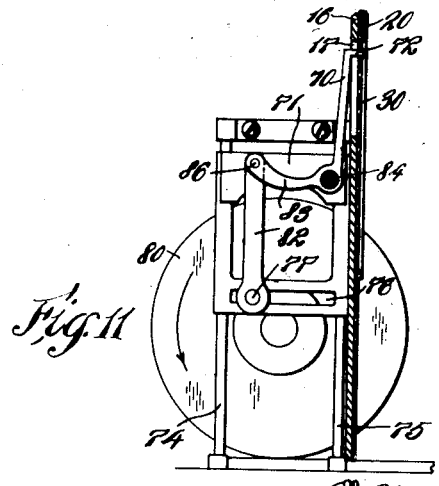
Fig. 11
Fig. 12
Fig. 13
INVENTOR
Walter Parkes,
BY Baker Macklin
ATTYS

UNITED STATES PATENT OFFICE.

WALTER PARKES, OF CLEVELAND, OHIO, ASSIGNOR, BY MESNE ASSIGNMENTS, TO HENRY C. OSBORN, OF CLEVELAND, OHIO.

MOTION-PICTURE CAMERA.

1,352,143.  Specification of Letters Patent.  Patented Sept. 7, 1920.

Application filed July 21, 1917. Serial No. 181,943.

*To all whom it may concern:*

Be it known that I, WALTER PARKES, a subject of the King of Great Britain, residing at Cleveland, in the county of Cuyahoga and State of Ohio, have invented a certain new and useful Improvement in Motion-Picture Cameras, of which the following is a full, clear, and exact description, reference being had to the accompanying drawings.

The object of this invention is to provide a very simple and compact motion picture camera which may be cheaply constructed and readily operated without requiring particular skill. My invention provides a very simple and effective mechanism for feeding the film during the taking of the picture. The mechanism allows very easy and convenient threading of the film from one reel to the other. Visual focusing may be had, if desired. My camera is also adapted for inspecting the produced picture in motion. It may also be conveniently employed in making single exposures whenever desired, and it has various other advantageous features hereinafter explained.

The feeding mechanism of the camera enables it to operate on paper films without tearing them, and the camera is thus adapted for use, if desired, with a reel of positive paper, to be subsequently displayed by a suitable opaque projection apparatus. The employment of a positive opaque film produces a set of views which may be readily inspected in the camera itself in a form corresponding to the picture to be displayed on a screen, though in miniature.

My invention is hereinafter more fully described in connection with the accompanying drawings, which show a preferred embodiment of it. The essential characteristics of the invention are summarized in the claims.

Figure 1:
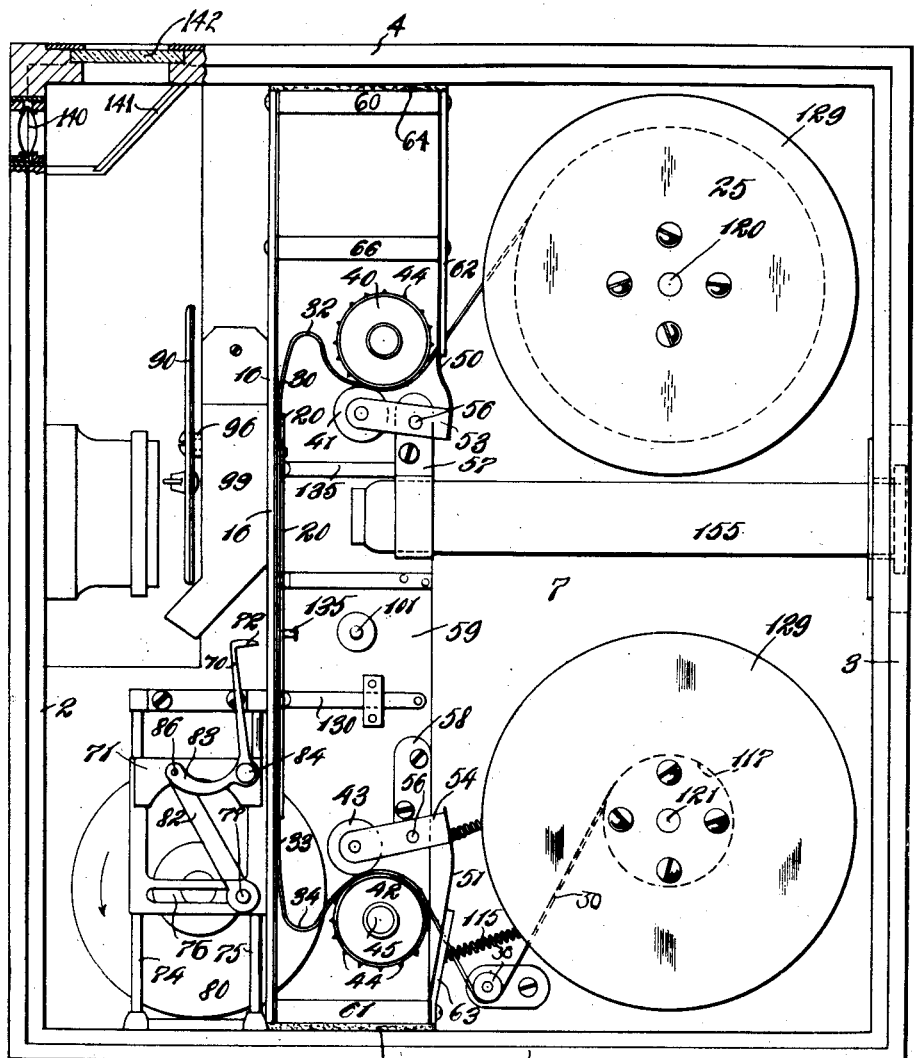
Figure 2:
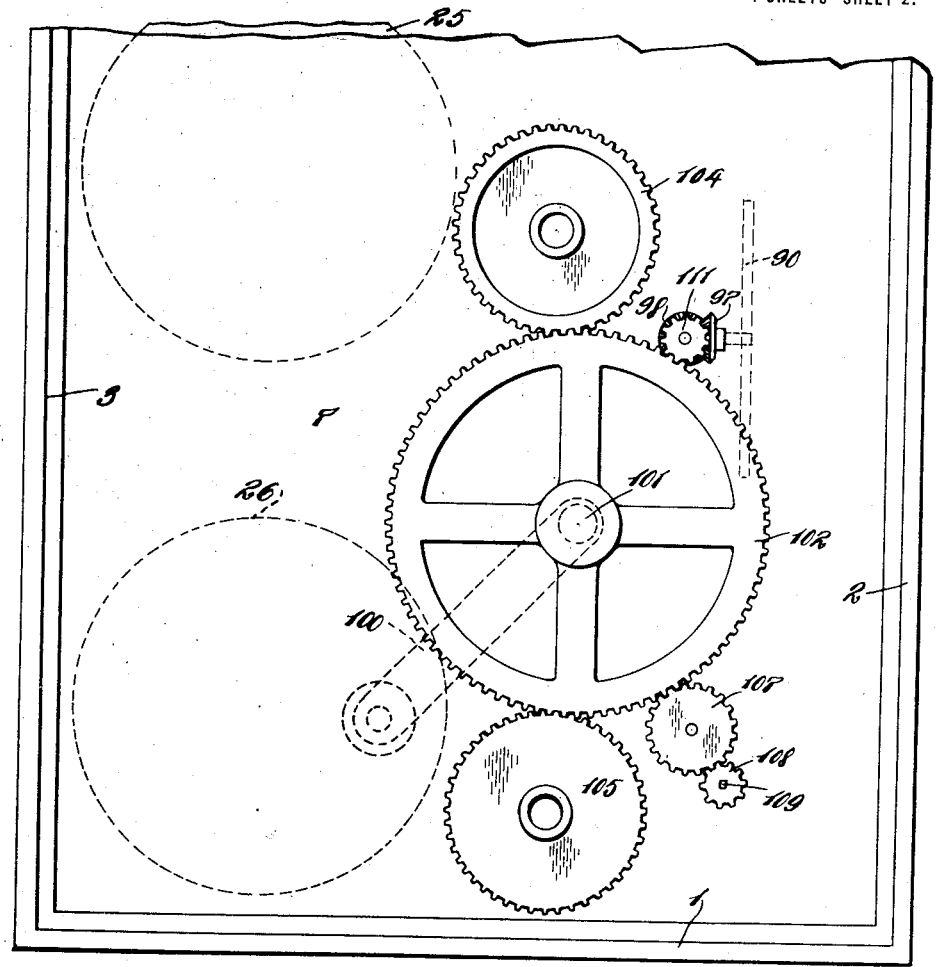
Figure 3:
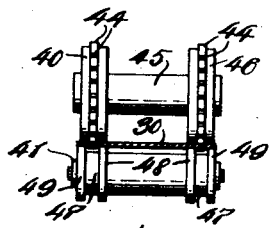
Figure 4:
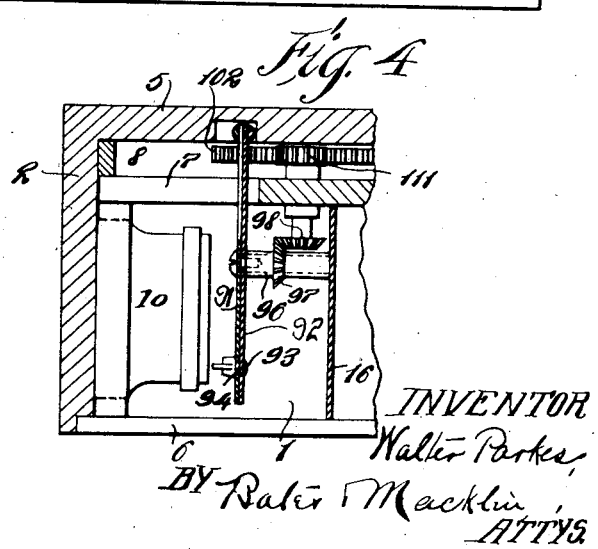

In the drawings, Figure 1 is a side elevation of the camera with the adjacent side cover removed. In this view the film feeding mechanism is on its upward or idle stroke. Fig. 2 is a side elevation of the camera from the side opposite to Fig. 1, with the cover on that side removed, showing particularly the driving gearing. Fig. 3 is a detail of a pair of the film feeding rolls. Fig. 4 is a partial horizontal section just above the axis of the shutter; Fig. 5 is a horizontal section through the camera just above the lower reel. Fig. 6 is a vertical section of the camera looking toward the lens, the film-guiding plate being broken away. Fig. 7 is a diametric section of one of the reels. Fig. 8 is an elevation of the adjustable shutter. Fig. 9 is a vertical section between the feed rolls and the plate which guides the film, looking in the direction of the lens. Fig. 10 is a horizontal section through the film-guiding plate and the pressure plate coöperating therewith. Figs. 11, 12 and 13 are side elevations of the film feeding device in approximately its highest position, its intermediate position and its lowest position, respectively, all on the down or feeding stroke.

As shown in the drawings, the camera frame is a comparatively thin box having a base 1, front and rear walls 2 and 3, a top 4, a closed side 5, and an openable cover side 6, which, if desired, may be hinged to the rear of the box. Within the box adjacent to the closed side 5 and parallel with it is a vertical partition 7 dividing the interior into a main space which houses the reels, feeding mechanism and lens, and a comparatively narrow space 8 occupied by the gearing for operating the feeding mechanism and shutter.

10 designates the lens of the camera, which may be of any approved form and is preferably mounted in telescoping tubular sheet metal housings carried by the front plate 2 of the box. The lens in its tubular housing may lie entirely within the box and thus be protected by the wall thereof. Any suitable means (not shown) may be employed for adjusting the lens. Fig. 5 indicates at 13 the operating knob of a rotary focus adjuster, while the ring 14 indicates a rotary diaphragm adjuster.

Extending vertically across the main chamber some distance at the rear of the lens 10 is a stationary plate 16 which serves to guide the film and has a rectangular exposure opening 17 directly opposite the axis of the lens. At the rear of the stationary plate 16 is a vertical plate or door 20 spring-pressed against the plate 16, as hereinafter explained. The film passes between the plate 16 and the door 20, sliding along vertical ribs 19 on the plate, which engage the film adjacent its edges. The film is thus held in a vertical position during exposure.

The supply reel for the film is designated 25 and the receiving reel 26. These reels are duplicates and are interchangeable. The film 30 passes from the reel 25 between feeding rolls 40 and 41 and then bows upwardly in a loop 32 and then passes downwardly at 33 between the plates 16 and 20, and then bows downwardly in a loop 34 and passes between the feed rolls 42 and 43, thence downwardly beneath a guiding roll 38, and from thence to the receiving reel 26. The actual feeding of the film is accomplished by mechanism hereinafter described, which periodically engages the vertical portion of the film between the plates 16 and 20.

The rollers 40 and 41 are positively driven to keep the film supplied to the feeding mechanism, and the rollers 42 and 43, as well as the reel 26, are positively driven to take up the exposed film. The loops 32 and 34 vary in extent and thus enable either pair of feeding rollers to move the film continuously and at a constant rate, while the feeding device which engages the flat film acts intermittently and variably.

The feeding rolls 40 and 42 each consist of a pair of wheels provided with spurs 44 at their periphery, the two wheels being rigidly mounted on a tube or hub 45, which is rotatable on a stationary stud. Each roller 41 and 43 is formed with two circumferential grooves 47 (Fig. 3) standing opposite the spurs 44. At the sides of the grooves 47 are circular bearing portions 48 and 49 which are adapted to bear against the smooth peripheral portions 46 of the spurred wheels. The film 30, as usual, has two rows of openings 31 adjacent to its two edges. These openings are adapted to be occupied by the spurs 44 while the film is engaged by the smooth peripheral portions of the two coacting wheels.

The rolls 41 and 43 are spring pressed toward their coöperating spurred rollers by leaf springs 50 and 51 which press against the end of the intermediate portion of U-shaped straps 53 and 54 carrying the rollers 41 and 43 respectively. Each strap 53 or 54 is pivoted intermediately, as shown at 56. The direction of pressure of the leaf spring is such as to tend to swing these U-shaped levers about their pivots to press either feed roll 41 or 43 lightly against its coöperating spurred roll.

Either of the rolls 41 and 43 may be swung to idle position for threading the film by simply pulling it away from the coöperating roll, the spring 50 or 51 giving back to allow this movement, and an adjacent angularly extending portion of the spring then bearing against the U-shaped arm to hold the roll 41 or 43 in idle position. As shown, the pivots 56 are pins extending from small plates 57 and 58 which are secured to a suitable vertical plate 59 which is secured to, or forms a portion of, the partition wall 7. Suitable horizontal blocks 60 and 61 are secured to the inner faces of the top 4 and bottom 1 of the camera and to the film plate 16. Pads 64 and 65 of rubber or other elastic material may be mounted between the blocks 60 and 61 and the corresponding portion of the camera box. Stationary vertical strips 62 and 63 are provided at the rear of the leaf springs 50 and 51 and limit their rearward movement. The strip 63 is shown as secured to the block 61, and the strip 62 to the block 60 and a bracing block 66.

To give the desired intermittent feed to the straight portion of the film, I provide a pair of pivoted and bodily movable hooks 70 which are mounted near their lower ends on a vertically sliding carriage 71 and at their upper ends have prongs 72 adapted to extend through vertical slots 18 in the stationary plate 16 and slots 21 in the spring-pressed plate and intermediately engage the film holes on the down-stroke of the carriage and clear the film on the up-stroke.

The carriage 71 is slidably guided for vertical movement in any desired manner. As shown, it comprises a light member slidable on two stationary vertical rods 74 and 75 and provided with a horizontal slot 76 into which extends a crank pin 77 from a suitable disk crank 80 which constitutes also a fly wheel. Mounted on the crank pin 77 is a link 82, the upper end of which is pivoted to a rock arm 83 leading from the hooks 70 at their pivots 84. As shown, the arm 83 extends from one of the hooks 70, and the two hooks are rigidly connected by a hub-tube 85 journaled on a pin 84 projecting laterally from the carriage.

The result of the above construction is that, when the disk crank 80 is rotated, the crank pin 77 reciprocates the carriage up and down. At the same time this pin carries the lower end of the link 82 about in a circle. The result of this is that the hooks 70 are not only bodily reciprocated, but, during such reciprocation, are swung on their pivots 84. The crank is rotated in the direction of the arrow (Fig. 1) so that the crank pin is moving upwardly when adjacent to the plate 16. During such movement, therefore, the carriage is raised, but at this time the link 82 holds the hooks swung away from the plate 16. As the crank pin reaches the upper portion of its stroke, however, the crank pin traveling away from the plate 16 shoves the link 82 upwardly and swings the upper ends of the hooks 70 toward the plate so that, at substantially the top of the stroke, these hooks engage the film. During the downward stroke of the carriage the horizontal movement of the crank pin does not greatly vary the upper end of the link 82, as the pivot 86 is nearly directly over the major portion of the downward arc of the crank-pins' path, and thus the hook prongs 72 move only slightly in the film and not enough to become disengaged therefrom. Accordingly, the hooks move upwardly away from the film and then swing into engagement with it, and then move downwardly while maintaining such engagement and swing away from the film near the bottom of their stroke.

The above movement will be clearer from an inspection of Figs. 1, 11, 12 and 13, which show the relative position of the parts of the feeding mechanism at various portions of the stroke. Fig. 1 shows the feeding mechanism on the up-stroke with the hooks entirely out of contact with the film. Adjacent to the upper end of the stroke the horizontal travel of the crank pin away from the plate 16 swings the rock arm 83 upwardly and swings the hooks into engagement with the film, as shown in Fig. 11. This figure shows the position of the parts when the crank pin is just beginning its downward stroke. Fig. 12 shows the parts with the crank pin well on its downward stroke. During this movement the link 82 has simply swung on the pivot 86 without materially pulling on that pivot. This condition is maintained until the extreme bottom of the stroke, as illustrated in Fig. 13, where the crank pin is beginning to move rapidly in a nearly horizontal direction toward the plate 16. This movement draws on the link 82 and pulls downwardly on the pivot 86. This operates to swing the two hooks 70 to pull them out of engagement with the film. The engagement of the hooks with the film ceases just as the crank pin comes into its lowest position and then the film stops. Then throughout the raising stroke, the hook is entirely disconnected from the film, as shown in Fig. 1.

It will be seen that the mechanism above described is very simple in construction and at the same time operates to give just the desired movement, namely; a free upward movement of the prongs and the downward movement thereof in engagement with the film, the prongs entering the film substantially at the termination of the upward stroke and leaving the film substantially at the termination of the downward stroke. Furthermore, the movement of the prongs while in engagement with the film is accelerated from the time they enter until half way down, and then is gradually released until the lower end of the stroke, the result being that the prongs enter and leave the film openings under the most favorable conditions.

It will be apparent that the specific construction of the sliding carriage and the arrangement of the pivoted hooks may be varied from that shown, as desired, so long as the described movement is maintained. Experience has demonstrated that this movement produces a very positive regular feeding of the film, enabling the accurate exposure desired.

A suitable shutter 90 is provided between the lens housing and film plate 16, which periodically exposes the film through the window 17 and then shuts off the light until the exposed portion of the film has been advanced beyond the window. This shutter is preferably composed of two partially complete disks 91 and 92 concentrically mounted and adjustable with relation to each other by means of a pin 93 on one member extending through an arcual slot 94 on the other, a thumb nut on the pin 93 clamping the parts. When these partial disks are clamped they provide a sector-shaped opening 95 (Fig. 8) which gives the exposure for the proper length of time, when the crank is rotated at the desired speed. The shutter preferably has a tubular hub 96 shown in Figs. 1 and 4, journaled on a stationary piece, and carrying a bevel pinion 97 meshing with a gear 98 contained in a housing 99 secured to the frame plate 59.

The gearing for operating the two pairs of feed rolls, the receiving reel, the disk crank of the feeding mechanism, and the shutter is all contained in the narrow chamber 8 between the partition 7 and the side wall 5, and will now be described.

100 indicates the operating crank which is removably secured to a short shaft 101 journaled in bearings in the side plate 5 and partition plate 7. Rigid on this shaft between these two plates is the main driving gear 102. This gear meshes above with a gear 104 which is rigid on the hub of the feed roller 40. Below, the main gear 102 meshes with the gear 105 rigid on the hub of the feed roller 42. An idler gear 107 connects the main gear 102 with a pinion 108 on the crank shaft 109 of the disk crank 80, which operates the feed mechanism. The bevel 98 which drives the shutter has rigid with it a spur gear 111, which meshes with the teeth of the gear 102.

The take-up reel 26 is suitably connected with the train of gearing described, so that it is rotated. For this purpose I have shown a spring belt 115 extending from a belt sheave 116 on the side of the spur feed roller 42 to a belt sheave 117 connected with the shaft of the take-up reel 26. Other means may be employed for rotating the take-up reel, if desired.

It will be seen that the gearing described is comparatively simple and is adapted for housing in a very narrow space. The result of it is that the simple rotation of the crank 100 causes all the desired movements within the camera by very light power.

The two reels are preferably duplicates, so as to be interchangeable. The supply reel is mounted on a stationary journal pin 120 and is pressed by a suitable retarding spring so that it will not unduly unwind. The receiving reel is mounted on a rotatable pin 121 which is connected with the sheave 117 of the spring belt 115. The rotary engagement may readily be effected by a non-circular head 125 on the side of the sheave adapted to engage a correspondingly formed recess 126 on the reel. The reel may readily be made of a cylinder 127 of wood or similar material, and two thin metal disks 128 and 129 secured to opposite ends thereof, as shown in Fig. 7.

To enable the film to be very conveniently threaded into place I provide the means for swinging the feed rollers 41 and 43 away from the pronged rollers, and holding them disengaged, as already explained. I also arrange the door 20 so that it may be swung back away from the plate 16 and held in this position. This door is normally pressed against the plate 16 by a pair of leaf springs 130 secured to the plate 59 and bearing against the door in its upper and lower portions. The door may be swung open against the action of these springs, with its rear edge acting as though it were hinged. In such movement the forward edge of the door 132 (Fig. 10) comes into engagement with the hooked end 133 of a leaf spring 134. This spring serves to hold the door in this angular position as long as desired, allowing the ready threading of the film. A suitable knob 135 on the door enables it to be readily moved into this position.

By arranging the door in the manner described, it has all the advantages of a hinged door and the further advantage that, as it is held entirely by spring pressure, the whole door may give back, if necessary. Accordingly, if the prongs 72, when they start to engage the film, do not come opposite openings, they simply press the film and door away from the plate 16 and then, as the prongs move downwardly, they slide on the film until they come opposite the holes, when the door and film spring back into place. Accordingly, it is entirely immaterial what portion of the film the prongs strike when they swing into engaging position.

If it is desired to operate the camera to take individual pictures the same may be readily done by means of a small removable crank which may be secured to the shaft 109 of the disk crank 80 and each rotation of which will give one exposure. A suitable spring detent may be provided to normally hold such crank in position with the shutter closed and giving the crank a tendency to stop in any rotation.

In the usual operation of the camera the focusing may be accomplished by setting the lens according to estimated distance, any suitable finder being employed for locating the view. I have shown a usual form of finder in the upper front corner of the camera. This finder comprises a lens 140, mirror 141 and ground glass 142. I also provide means whereby the lens may be focused and the view located by inspection on a screen acting like ground glass. To this end I provide a pane 150 carried by the door 20 in a position normally below the window 17 but adapted to be brought into registration with the window, and I provide an inspection tube 155 through which the image may be viewed.

The tube 155 is carried within the camera box between the reels. It is shown as mounted near its inner end in an extension of the bracket 57 and near its outer end in the rear wall 3 of the box. The inner end of the tube carries a lens 156. Sliding within the outer end is a telescoping tube 157 carrying a lens 158 and a removable cap 159. Normally the cap shuts off the light from the tube. To view the image the cap is removed and the tube 157 drawn out a proper distance, and the view is inspected through the tube, the lenses of which are arranged to magnify the image and invert it.

The desired screen for focusing may be provided by making the pane in the door a piece of ground glass, or may be provided by having this pane transparent and inserting a piece of roughened celluloid in a position ordinarily occupied by the film. It is also possible, with certain films, for the film itself to constitute the screen, and, in that case, the pane is also transparent. Should it be desired to employ in the door both a plain glass pane and a ground glass pane this may be readily effected by arranging the door with the possibility of an increased vertical movement.

To prevent the door 20 being inadvertently shifted into raised position I provide an ear 144 thereon which ordinarily stands below the pin 145 carried by the plate 16. By swinging the door slightly away from this plate the ear may pass over the pin and thus the door be raised to bring the pane opposite the window.

It is sometimes desirable to use the camera as an inspection machine for a previously exposed and developed film. The inspection tube and the window in the door 20 may be employed for this purpose. In this use the developed film is wound face inwardly on the reel. The door 20 is placed to bring the transferred pane opposite the axis of the tube 155 and the crank is operated in the same manner as in taking a picture, the film traveling past the inspection opening and being wound up on the receiving reel. The magnifying and inverting lenses of the observation tube enable the film to appear in proper order and direction and large enough to be readily inspected.

During this inspection the film is suitably illuminated, either by daylight or artificially. The removal or opening of the front side of the camera enables such illumination to be readily effected.

It will be seen from the above description that, while my camera is simple in construction and has comparatively few parts, it is adapted to cover a variety of operations. It may be used in taking motion pictures or individual exposures; the focusing may be by estimate or visual; and the machine may be employed to inspect the produced picture. The mechanism has been designed with a view to cheapness of construction as well as to efficiently perform the operations desired.

Having thus described my invention, what I claim is:

1. In a motion picture camera, the combination, with means for guiding the film, of a reciprocating member, a crank, means connecting the crank pin with said member, a hook pivoted to the member, a rock arm connected with the hook, and a link connecting said rock arm with the crank pin.

2. In a motion picture camera, the combination, with means for guiding the film, of a reciprocating member, a crank, means connecting the crank pin with said member, a bell crank pivoted to the member and having one of its arms adapted to engage the film, and a link connecting the other arm of the bell crank with the crank pin.

3. The combination with a stationary film guiding plate, of a plate coacting therewith and pressed against the stationary plate by leaf springs, said spring-pressed plate being adapted to be swung away from the stationary plate against said springs with one edge of the spring-pressed plate acting as a hinge, and a spring latch adapted to engage the other edge for holding the spring-pressed plate swung away from the stationary plate.

4. In a motion picture camera, the combination of a stationary film-guiding plate, a coacting movable plate, a pair of leaf springs bearing at their free ends against the movable plate to hold it yieldingly against the film, said movable plate being adapted to be swung away from the stationary plate against said springs, with one edge of said movable plate acting as a hinge, and means adapted to engage the film and feed it.

5. In a motion picture camera, the combination of a stationary film-guiding plate, a coacting movable plate, a leaf spring anchored to a support adjacent to one edge of the movable plate and bearing at its free end against the movable plate to hold it yieldingly against the film, said movable plate being adapted to be swung away from the stationary plate against said spring, with one edge of said movable plate acting as a hinge, and means adapted to engage the film and feed it.

6. In a motion picture camera, the combination with an intermittent feed of a film guiding plate, a spring pressed plate coöperating therewith, means whereby a film may be threaded between said plates, a window in the film-guiding plate, a window in the spring pressed plate, and means whereby said spring pressed plate may be moved longitudinally to cause its window to be in registration or out of registration with the window in the first mentioned plate.

7. In a motion picture camera, the combination with an intermittent feed of a stationary film-guiding plate, a movable spring pressed plate coacting therewith on the opposite side of a film, a window through the film guiding plate, a corresponding window through the spring pressed plate, a glass pane in the last mentioned window, and means whereby the spring pressed plate may be moved longitudinally to carry the pane into or out of registration with the window in the stationary plate.

8. In a motion picture camera, the combination with an intermittent feed of a stationary plate for guiding the film, a coöperating plate, means whereby a film may be threaded between said plates, leaf springs pressing the latter plate against the stationary plate, the stationary plate having an exposure opening and the spring pressed plate being movable longitudinally to bring a viewing portion thereof into or out of registration with said opening, and means for preventing inadvertent movement of the spring pressed plate.

In testimony whereof, I hereunto affix my signature.

WALTER PARKES.